June 14, 1955     J. SCHULEIN     2,710,772
COMBINATION AUTOMOBILE HOOD ORNAMENT
AND ADJUSTABLE BUG DEFLECTOR
Filed Aug. 18, 1951
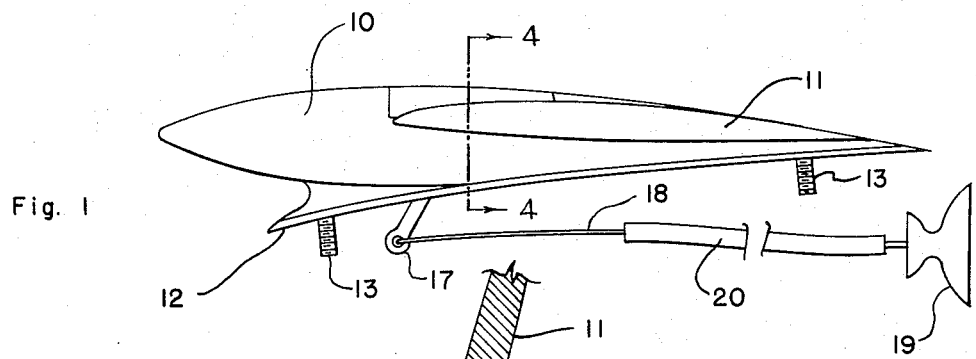
Fig. 1
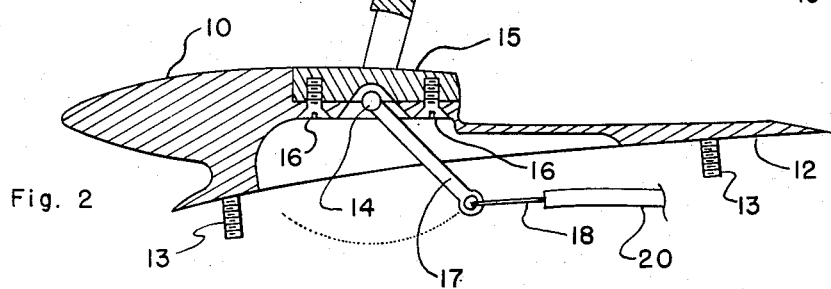
Fig. 2
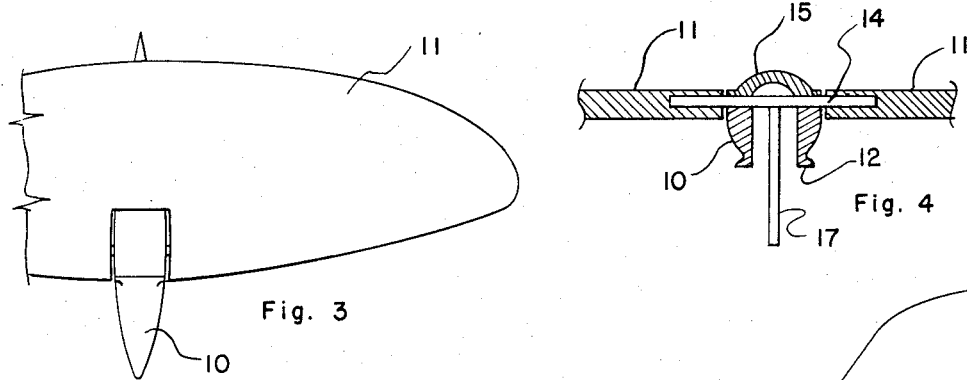
Fig. 3
Fig. 4
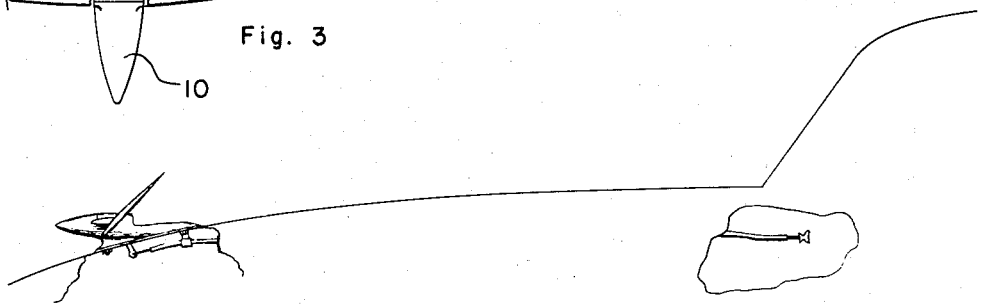
Fig. 5
INVENTOR
Joseph Schulein

United States Patent Office 2,710,772
Patented June 14, 1955

2,710,772

COMBINATION AUTOMOBILE HOOD ORNAMENT AND ADJUSTABLE BUG DEFLECTOR

Joseph Schulein, Corvallis, Oreg.

Application August 18, 1951, Serial No. 242,530

2 Claims. (Cl. 296—91)

This invention relates to improvements in bug deflectors for moving vehicles and is particularly adaptable to motor vehicles.

In the past bug deflectors have been made of single pieces of materials arranged to be mounted rigidly on the front hood ornament of motor vehicles. The improvement made herein is for the purpose of overcoming the objectionable features of those bug deflectors previously used, and for the purpose of giving an instantaneously adjustable means of utilizing such a bug deflector when wanted without the necessity of stopping the vehicle in order to attach such a device.

A further objective is to provide continuously adjustable means by which the angle of the deflecting surface can be instantaneously varied to suit the driving conditions then encountered.

A further objective is to combine the above functions in a manner which will be pleasing to the eye and ornamental to the vehicle. Other advantages and objectives of my device will appear as this specification proceeds.

Referring to the accompanying drawing:

Fig. 1 is an elevation of my device showing the bug deflecting wing portion of the same in inoperative position;

Fig. 2 is a fragmentary sectional elevation of the device taken on the longitudinal center line and illustrating the bug deflecting wing portion in operating position;

Fig. 3 is a fragmentary plan view of the device as shown in Fig. 1;

Fig. 4 is a fragmentary transverse section taken on line 4—4 of Fig. 1; and

Fig. 5 is a fragmentary elevation illustrating my device mounted in position on an automobile hood, with the bug deflecting wing portion of the device in operating position.

Referring first to Figs. 1 and 2, my device includes an ornamental main body portion 10 and a pivotally mounted adjustable wing member 11 adapted to serve as part of the complete automobile ornament and also as a bug deflector when in raised position. The wing member 11, as illustrated in Figs. 2 and 3, is secured on a horizontal, transversely-extending hinge shaft 14, which shaft in turn is hingedly mounted in the main body portion 10. A section is cut out of the top of the main body portion 10 to accommodate a set-in block 15 which combines with the body portion 10 in forming a bearing for the hinge shaft 14. The set-in block 15 is secured in place in the body portion by the screw 16, as shown in Fig. 2.

A lever 17 is rigidly secured to the hinge shaft 14 at the center of the shaft and extends down through a suitable opening in the top of the body portion and through the hollow middle part of the body portion, as shown in Figs. 2 and 4, and through a slot formed in the automobile hood when the device is mounted on the hood. A flexible cable 18 is attached to the lower end of the lever 17.

Figure 5 illustrates how the whole device is mounted on the hood of a motor vehicle in the position of the conventional hood ornament. I prefer to attach my device to the hood by means of the bolts 13 as shown in Figure 1 and Figure 2. For the purpose of providing the proper fit I give a curvature as shown by 12 in Figure 1 to the bottom surface of body 10 to conform to the curvature of the particular hood upon which the device is to be mounted, and I provide a slot in such hood in the proper location to permit lever arm 17 to extend inside the hood and there be attached internally to cable 18 whose handle 19 I prefer to install on the control panel or dashboard of the vehicle as illustrated in Figure 5.

It will thus be seen that I have provided an ornamental and useful device which when in its closed position as shown in Figure 1 provides a suitable and artistic hood ornament, and when in various open positions, as illustrated in Figure 5, provides an obstructing surface to the smooth flow of air currents above the hood, caused by the relative motion of the vehicle through the air, such disturbed wind pattern tending to carry small particles of solids, small insects, and the like, over the top of the vehicle's wind shield in such a manner as to prevent such solid matter, small insects, and the like, from striking upon and becoming attached to said wind shield.

It will be readily apparent from the construction shown in the drawing, and the description heretofore made, that the further the handle 19 is pulled, the greater the angle with the horizontal of the wing surface 11, will be. In order to hold the wing 11 at any desired angle, I prefer to provide enough frictional resistance between the cable 18 and the cable conduit 20 so as to resist any tendency of the wind pressure upon wing 11 from returning said wing to a horizontal position.

Thus it is seen that I have provided an effective and rapid means of adjusting the angle of the wing 11 so that the operator can select the best angle for accomplishing the deflection of small solid particles, bugs, and the like, dependent upon the conditions under which the vehicle is moving. To provide the operator with a complete choice of angle, I prefer to make my device adjustable, by means of motion of lever arm 17, to the extent that wing 11 can be adjusted from a horizontal position to an angle approaching the vertical.

It is obvious that the wing member 11, since it is to be used as a wind-stream obstructing surface, must be large enough to accomplish such purpose. I have found that such an obstructing surface whose dimensions are approximately 8 inches from tip to tip and approximately 5 inches from front to rear at the widest central portion, and with the outer ends of the wing narrowed and rounded, gives a sufficiently obstructing surface so as to be useful in performing a deflecting function when attached to an ordinary motor passenger vehicle, and I thus prefer to make my device with a wind confronting section of approximately that size. My device can be made in a variety of styles or design but the wind confronting surface should be of size commensurate with the deflection to be accomplished. The rounding of the outer ends of the wing member not only improves the design but also prevents excessive air current eddies around the ends of the wing member when the latter is in raised position.

While I have shown only the preferred form of my device, I realize that many changes in details of construction could be made without departing from the scope of my invention, and I wish it understood that I do not want to be limited to the exact design shown in my drawing, or otherwise limited except as set forth in the claims.

I claim:

1. A combination automobile hood ornament and adjustable bug deflector of the character described including a main body, means for securing said main body firmly on top of the forward central portion of the hood of an automobile to serve as an ornament thereon, an ornamental wing straddling said main body and hinged to said main body so as to swing up and down on an axis normal to the direction of travel of the automobile, said hinge axis spaced a sufficient distance above said automobile hood to enable said wing to rest in substantially horizontal position entirely spaced from said hood, said wing extending out an equal distance beyond each side of said main body, the outer ends of said wing being rounded and of identical shape and size, and means for setting said wing in desired partially rotated position, whereby said wing can be held in a normal substantially horizontal plane or held in a desired upwardly-tilted bug-deflecting position.

2. A combination automobile hood ornament and adjustable bug deflector of the character described including a main body, means for securing said main body firmly on top of the forward central portion of the hood of an automobile to serve as an ornament thereon, a hinge shaft mounted in said main body a spaced distance above said hood and extending horizontally and transversely through said main body, a wing member straddling said main body and secured to said hinge shaft, said wing member extending out an equal distance beyond each side of said main body, said hinge axis spaced a sufficient distance above said automobile hood that said wing member will be spaced above said automobile hood at all times a lever arm connected with said hinge shaft, an opening in said automobile hood, said lever arm extending down through said opening, and means mounted in the dashboard of the automobile for operating said lever arm, whereby said wing member can be held in a normal substantially horizontal plane or held in a desired upwardly-tilted bug-deflecting position.

References Cited in the file of this patent

UNITED STATES PATENTS

| 2,049,360 | Erickson | July 28, 1936 |
| 2,112,709 | Reynolds | Mar. 29, 1938 |

FOREIGN PATENTS

| 440,954 | Great Britain | June 11, 1935 |